United States Patent Office 3,466,420
Patented Sept. 9, 1969

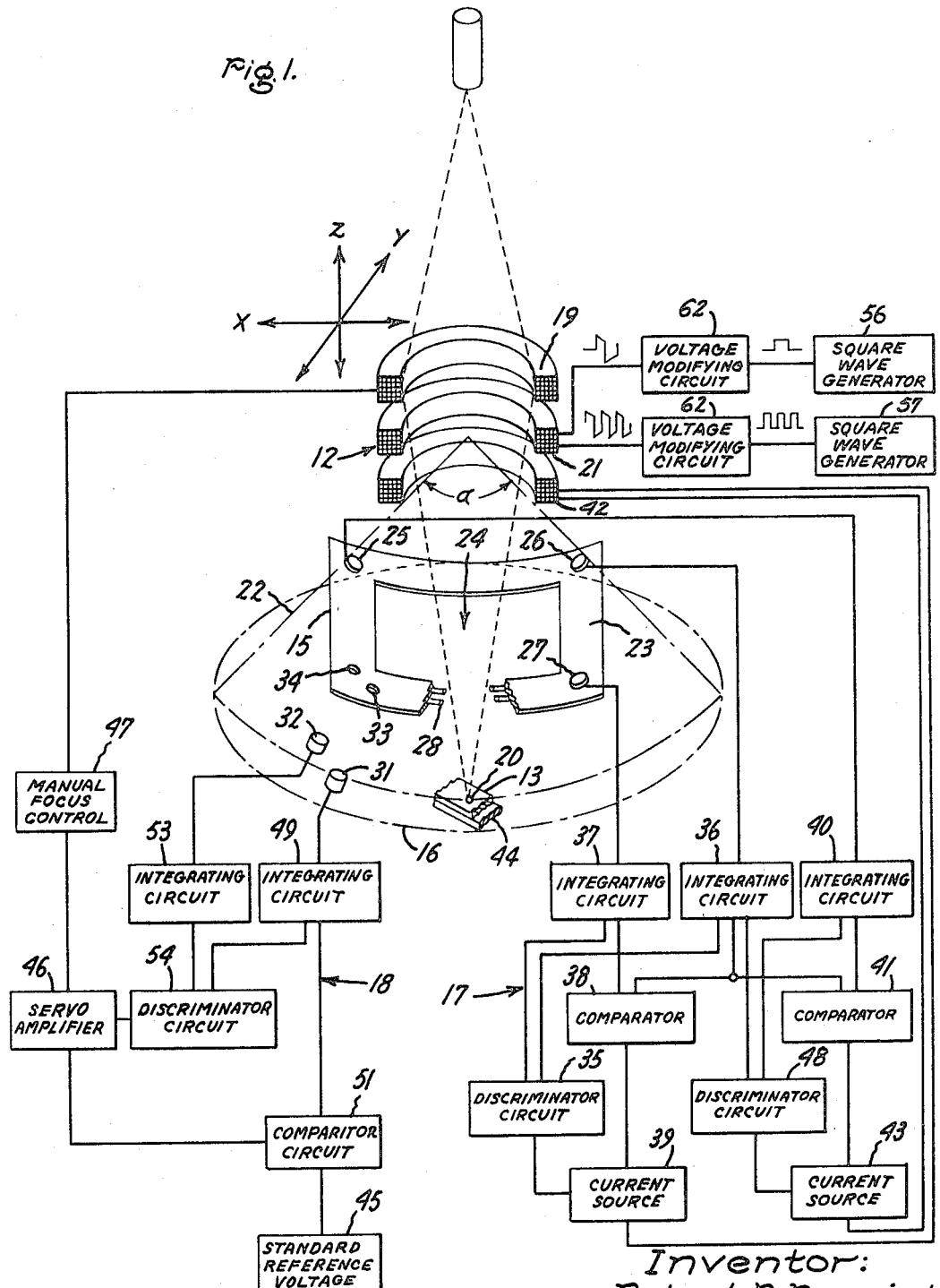

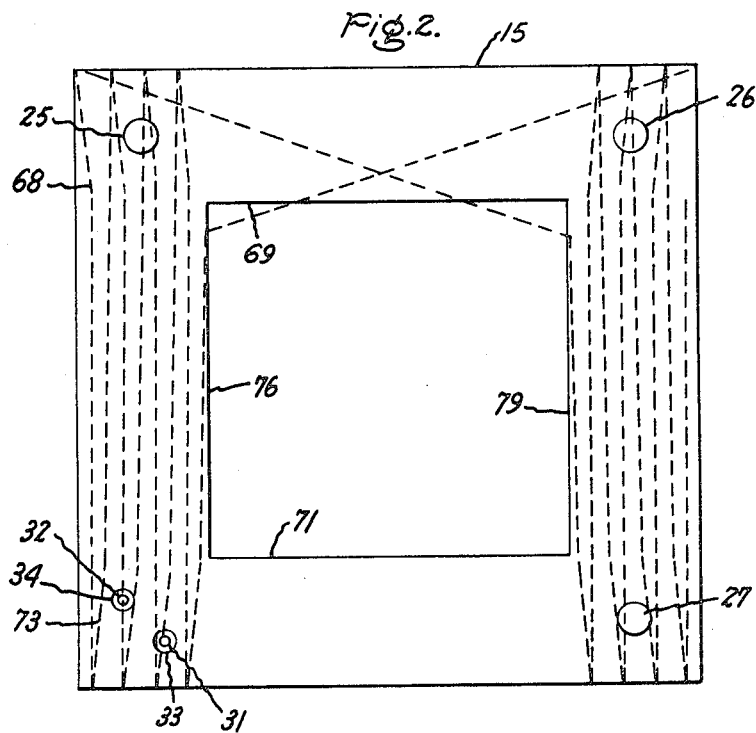
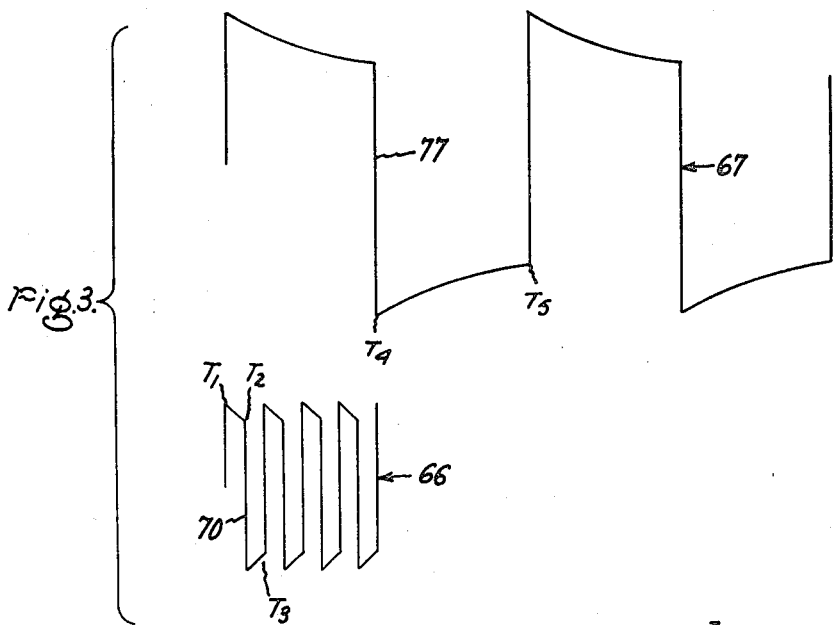

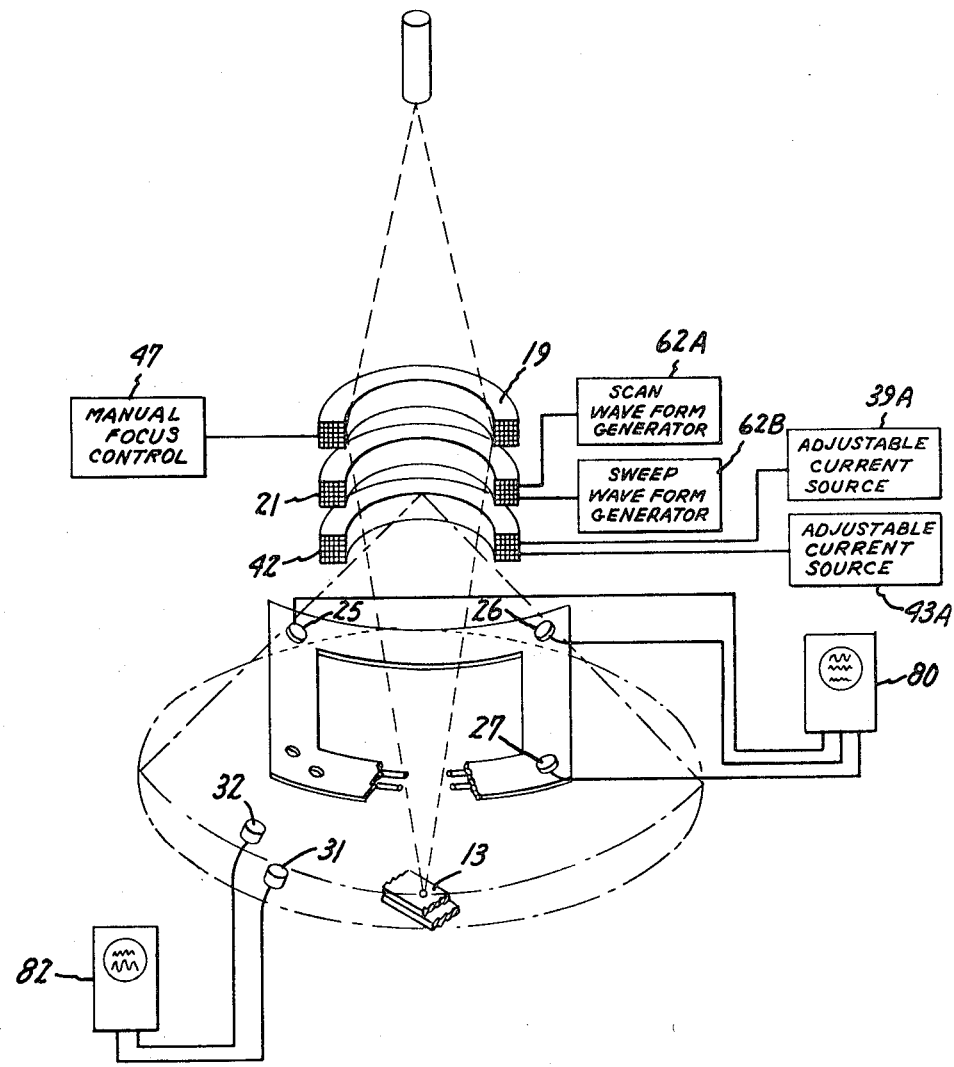

3,466,420
ELECTRON BEAM WELDING APPARATUS
Robert D. Downing, Schenectady, N.Y., assignor to General Electric Company, a corporation of New York
Filed July 10, 1967, Ser. No. 652,125
Int. Cl. B23k 9/00
U.S. Cl. 219—121            4 Claims

ABSTRACT OF THE DISCLOSURE

An electron beam is located and stored prior to electron beam welding by a centrally apertured electron beam absorber axially disposed relative to the electron beam. The absorber preferably is located outside the focal plane of the beam and the beam is scanned and swept across both the absorber and the workpiece to be welded by an electromagnetic deflection coil energized with time rate change current pulses. The deflection coil current pulses effect relatively long beam dwell periods upon the surface of the beam absorber with the electron beam sweeps across the workpiece being accomplished during a steeply sloping portion of the deflection current pulses to protect the workpiece from melting. Cooling means are provided within the beam absorber to dissipate heat produced by the non-focused electron beam impinging upon the beam absorber.

THE DISCLOSURE

This invention relates to a charged particle beam apparatus and in particular to a charged particle beam apparatus wherein means are provided for receiving and dissipating power from the beam when bombardment of the workpiece is not desired.

The exact positioning of a charged particle beam is of critical importance in a plurality of applications such as electron beam particle accelerators and ion depositions during the formation of semiconductors. For example, in electron beam welding, the focal point of an electron beam must be located precisely relative to the workpiece o be welded in order to form a structurally sound weld. One method previously proposed to locate the focal point of a charged particle beam generally comprises the lowering of an electron beam power to a nondestructive level, the observation of the beam focal point upon a workpiece to be bombarded, and the raising of the beam power to a working magnitude. Variations in electron beam power generally have been ineffective in locating the beam focal point however because the focal point of the beam varies with increased ionization in the welding chamber as the power of the beam is raised. Focal point variations with the degree of ionization in the welding chamber also present problems when the welding beam is terminated prior to completion of a weld, e.g. on resumption of welding the beam focal point generally does not return to the welding location until the electron beam has returned the welding chamber to the previous ionization level. If the electron beam is retained continuously at a welding power, the workpiece being welded may be damaged by excessive electron beam bombardment.

It is therefore an object of this invention to provide a charged particle beam apparatus wherein the beam can be absorbed when bombardment of a workpiece is not desired.

It is another object of this invention to provide a charged particle beam apparatus wherein the beam can be removed from the workpiece without an extinguishment of the beam.

It is another object of this invention to provide a charged particle beam apparatus wherein the beam is deflected from the plane of the workpiece to a beam storage medium located outside the axial focus of the charged particle beam.

These and other objects of this invention generally are accomplished by a charged particle beam apparatus having a source of charge particles and means for focusing the charged particles into a beam impinging upon a desired location along a workpiece by the inclusion of means for deflecting the charged particle beam from the desired location and means for receiving and dissipating power from the deflected charged particle beam when bombardment of the workpiece is not being effectuated. Preferably the beam is periodically traversed between the workpiece to be bombarded and the dissipating means in a non-uniform sweep pattern having a minimum charged particle beam dwell period occurring as the beam sweeps the workpiece and a maximum charged particle beam dwell period occurring as the beam sweeps the dissipating means. To minimize the power density transferred from the charged particle beam to the dissipating means, the dissipating means are situated at a non-focused location relative to the deflected beam.

The features of this invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic diagram of an electron beam welding apparatus in accordance with this invention, FIG. 2 is a plan view of the beam absorber employed in the electron beam welding apparatus, FIG. 3 depicts waveforms suitable for traversing the electron beam at diverse rates across the beam absorber, and FIG. 4 is a schematic portrayal of an electron beam apparatus suitable for beam focal point detection during welding.

A charged particle beam apparatus constructed in accordance with this invention is specifically depicted in FIG. 1 as an electron beam welding apparatus and includes an electron beam source 11, a plurality of electromagnetic focusing and deflection coils, generally identified by reference number 12, for positioning and traversing the electron beam relative to the workpiece 13 to be welded, and a centrally apertured electron beam absorbed 15 for receiving and dissipating power from the traversing electron beam when welding of the workpiece is not being effectuated.

Electron beam source 11 may be any conventional source utilized to produce an electron beam of sufficient intensity for welding purposes, e.g. the source may comprise a hot cathode electron emitter such as a Pierce gun or the source may comprise a cold cathode device such as a plasma electron beam structure. The beam generated by source 11 passes through an electromagnetic focusing lens 19 which lens focuses the electron beam upon a desired spot location 20 to produce a good weld in workpiece 13. The depth of the focal spot within workpiece 13 is variable dependent upon the material to be welded and generally lies between ¼ and ½ the thickness of the workpiece for most metals.

An electromagnetic deflection coil 21 is positioned immediately below focusing lens 19 and functions to simultaneously sweep and scan the electron beam across electron beam absorber 15 during a determination of the spatial location of the electron beam focal point prior to welding. The direction of the sweep and the scan preferably are mutually perpendicular and the portion of the beam below deflection coil 21 traverses an approximately spherical segment 22 having a large arcuate angle, e.g.

90°, to give a substantial field of scan. Thus if the axial direction of an undeflected electron beam from source 11 to workpiece 13 is considered to be along the Z axis, a sweep current applied to deflection coil 21 preferably produces a beam motion along the Y axis while a scan current applied to the deflection coil will produce a beam motion along the X axis. Although the operation of deflection coil 21 is somewhat similar to the operation of a deflection coil in a conventional television video tube, deflection coil 21 preferably is non-compensated so that the focal point of the electron beam traverses an arcual pattern as the electron beam is moved in either the X or Y direction. When non-synchronous currents are applied simultaneously to the sweep and scan portions of deflection coil 21 the focal point of the electron beam generally defines a surface 16 approximating a spherical arc having a center situated along the plane of the deflection coil.

Beam absorber 15 generally comprises a rectangular framelike structure 23 having a central aperture 24 for the passage of the electron beam to workpiece 13. The beam absorber preferably is fabricated from a high heat conductivity metal, e.g. copper, and is of substantial thickness, e.g. ½ inch, to absorb a substantial quanity of heat from the traversed electron beam without deterioration of the beam absorber. Although aperature 24 is depicted as being larger relative to the sides forming beam absorber 15, in actual practice the aperture is only slightly larger than the dimension required to pass a properly focused electron beam, or approximately one inch, while the sides of structure 23 are substantially larger to be impinged upon by the electron beam during a major portion of a scan cycle. Three spaced-apart sensors 25, 26 and 27 are situated along three corners of the beam absorber to detect the location of the electron beam with sensors 26 and 27 being aligned parallel to the Y axis. The beam absorber is aligned in a Z plane, e.g. a plane perpendicular to the beam axis, preferably at an elevation differing from the spherical arc 16 defined by the focal point of the electron beam during a beam traversal by deflection coil 21. Thus the electron beam strikes beam absorber 15 and sensors 25, 26 and 27 in a non-focused condition thereby minimizing the energy density of the beam upon the absorber and the possibility of damage to the absorber due to melting. A plurality of conduits 28 are situated along the lower surface of beam absorber 15 and serve as passageways for a flowing coolant functioning to transfer heat from the absorber by conduction. Although Faraday cages are preferred for utilization as the electron beam sensors because of the relative immunity of the Faraday cage to radiation damage, any other type sensor capable of detecting the presence of an electron beam, e.g. solar cells or thermistors, also can serve as the sensors along beam absorber 15.

Fourth and fifth Faraday cages 31 and 32 are positioned in registration with dual apertures 33 and 34, respectively, in beam absorber 15 with Faraday cage 31 being situated below the beam absorber surface along the generally spherical arc 16 defined by a traversal of an electron beam properly positioned for welding of workpiece 13. Faraday cage 32 is positioned along a generally spherical arc concentric with and of smaller radius than the spherical arc 16 wherein Faraday cage 32 is situated. Suitable means (not shown) such as a screw thread drive are provided to radially adjust the positioning of Faraday cage 31 dependent upon the thickness and material of workpiece 13 to conform the location of cage 31 with the desired focal spot arc for the particular workpiece.

As the electron beam is swept by deflection coil 21 across sensors 26 and 27 to locate the beam along the Y axis prior to commencement of a welding operation, output signals are produced by the sensors proportional to the intensity of the electron beam striking the sensors. When the beam is directly centered between the sensors, the output signals from the sensors are equal. However when the beam is not centered between the sensors, e.g. the beam is located more proximate sensor 26 than sensor 27, the output signals from sensor 26 are greater in magnitude than the output signals from sensor 27 due to variations in the intensity of the impinging electron beam along the axial length of the beam. The output signals from sensors 26 and 27 are fed to relatively long time constant integrating circuits 36 and 37, respectively, e.g. a time constant of approximately 3 seconds is suitable for a 150 ma. electron beam at a sweep frequency of 60 cycles, to produce a voltage output from the integrating circuits proportional to the generated signals from the sensors over a long time interval, e.g. 3 seconds. By integrating over a long time period, the degree of interaction between a sensor and the electron beam during a single scan is diminished and the signal produced by an integrating circuit having a long time constant, e.g. 3 seconds, is proportional to the generated signals from the sensors over a large number of scans, e.g. 180 scans for a scan frequency of 60 cycles per second. Besides summing the signals from the sensors over a plurality of scans, the integrating circuits also function to produce an output signal having a magnitude, as determined principally by the beam current and the dwell period of the beam upon the sensors, which can be more conveniently utilized. The output voltages from integrating circuits 36 and 37 are fed to a comparator circuit 38, such as a differential amplifier, to produce an output signal from the comparator circuit corresponding to the difference between the generated signals from sensors 26 and 27 over the integrating interval of integrating circuits 36 and 37.

The direction of the beam misalignment is determined by a discriminator circuit 35, e.g. a differentially fed transformer winding, which circuit receives the output signals from integrating circuits 36 and 37 and generates an output signal indicative of the respective magnitudes of the integrated outputs from sensors 25 and 26. The output signals from comparator 38 and discriminator circuit 35 are applied to adjustable current source 39 to control the magnitude and polarity of the correctional current waveform applied to steering coil 42 to move the electron beam along the Y axis to a center location between sensors 26 and 27.

The location of the electron beam along the X axis is detected in a manner similar to that used in the detection of the beam along the Y axis. Thus the electron beam is scanned by deflection coil 21 across sensors 25 and 26 to produce output signals from the sensors proportional to the intensity of the electron beam striking the sensors, e.g. proportional to the axial distance of the sensors along the traversed electron beam. When the electron beam is centered intermediate sensors 25 and 26, equal voltages are produced by the sensors. If the beam is situated more proximate sensor 25 than sensor 26, the output signal from sensor 25 is in excess of the output signal produced by sensor 26. The output signals from the sensors are fed to integrating circuits 36 and 40 which circuits function to sum the output signals from each of sensors 25 and 26 over a relatively long period, for example three seconds, before the integrated output signals are compared in comparator circuit 41 to produce a signal proportional to the generated signals from the sensors. The integrated output signals from sensors 25 and 26 also are applied to a discriminator circuit 48 to produce an output signal indicative of the respective magnitudes of the signals from the sensors. The output signals from comparator circuit 41 and discriminator circuit 48 are fed to adjustable current source 43 thereby producing a current waveform for steering coil 42 of sufficient magnitude and polarity to center the electron beam between sensors 25 and 26. Because workpiece 13 can be positioned relative to the known locations of the sensors along beam absorber 15, centering of the electron beam both between sensors 25 and 26 and between sensors 26 and 27 assures proper positioning of the beam along the plane of workpiece 13 relative to the joint to be welded.

Because beam absorbed 15 is situated outside the focal plane of the traversed electron beam, the impinging electron beam is spread over a substantial area of beam absorber 15 and heat damage to the beam absorber is reduced by the non-focused condition of the beam upon the beam absorber. Similarly, the dwell period of the electron beam is varied (as is more fully explained with reference to FIGS. 2 and 3) to provide a minimum dwell period of the focused beam upon workpiece 13 during a beam traversal across the workpiece. Workpiece 13 therefore can be positioned on worktable 44 without damage notwithstanding the fact that the traversed electron beam is of a welding intensity.

The location of the focal point of the electron beam along a Z plane, or axial plane, is detected and controlled by a focus control circuit 18 which circuit generally includes Faraday cages 31 and 32, a standard reference voltage source 45 and a servo amplifier 46 controlling the positioning of manual focus control 47. Faraday cage 31 is positioned below beam absorber 15 along the approximately spherical arc 16 defined by the focal point of a properly centered electron beam during a beam traversal wherein the focal point passes through the desired spot location 20 for welding and is aligned with aperture 33 in the beam absorber to permit impingement of the electron beam upon the Faraday cage as the electron beam is traversed over aperture 33. The output signals from Faraday cage 31 are fed to an integrating circuit 49 having a long time constant, e.g. approximately 3 seconds, to provide an output signal proportional to the sum of the signals generated by Faraday cage 31 over a plurality of spans. The output from integrating circuit 49 and a standard reference voltage from source 45, which reference voltage is set equal to the obtainable voltage output from Faraday cage 31 during a traversal of an electron beam situated directly upon the desired focal spot location 20 for welding workpiece 13, are applied to a comparator circuit 51 to produce an output signal proportional to the variation between the actual generated output from Faraday cage 31 and the generated output from the Faraday cage when the focal point of the traversed electron beam impinges upon the Faraday cage. Because the obtainable voltage from Faraday cage 31 is dependent upon such factors as the electron beam power employed for welding and the speed of the beam sweep across the Faraday cage, reference voltage source 45 preferably is a variable source, e.g. a potentiometer, and the voltage settings for various beam power levels are determined empirically during initial testing of the electron beam apparatus. The output signal from comparator circuit 51 is fed as an error signal to servo amplifier 46 which servo amplifier, upon receipt of the error signal, adjusts manual focus control by an amount proportional to the magnitude of the error signal. Adjustment of manual focus control 47 varies the applied current to electromagnetic focusing lens 19 to properly focus the electron beam on workpiece 13.

Because the output voltage produced by Faraday cage 31 decreases upon axial movement of the focal point away from the Faraday cage in either direction, a second Faraday cage 32 is positioned proximate and at a diverse axial location than Faraday cage 31 to determine the direction of the axial movement of the focal point. Faraday cage 32 is positioned in alignment with aperture 34 of detector 15 and preferably is situated along an arc interiorly concentric with the arc 16 wherein Faraday cage 31 lies. Thus if the focal point of electron beam moves axially upwardly toward the surface of workpiece 13, the focal point of the traversed electron beam approaches more proximate Faraday cage 32 and the output voltage produced by Faraday cage 32 increases. The upward movement of the focal point also results in a lower output voltage from Faraday cage 31 which cage is axially situated at the desired focal point of the traversed electron beam for welding workpiece 13.

The output voltage from Faraday cage 32 is fed to an integrating circuit 53 having a long time constant, e.g. preferably at least 3 seconds, to provide a voltage output from the integrating circuit proportional to the sum of the voltages generating during a plurality of traversals of the Faraday cage by the electron beam. The output signal from integrating circuit 53 is compared with the output of integrating circuit 48 in a discriminator circuit 54, e.g. a differentially fed transformer winding, to produce an output voltage from the discriminator circuit characteristic of the axial movement of the focal point. The output of discriminator circuit 54 then is fed to servo amplifier 46 to control the direction of movement of the servo amplifier. Thus variations between the output voltage produced by Faraday cage 31 and standard reference voltage source 45 determine the degree of adjustment required of manual focus circuit 47 while a comparison of the output voltages of Faraday cages 31 and 32 determine the axial direction of the electron beam focal point correction required. The output signal from manual focus circuit 47 then is applied to electromagnetic focusing lens 19 to properly focus the beam on workpiece 13.

The scan pattern preferred for traversing the electron beam across the beam absorber 15 can best be understood with reference to FIGS. 2 and 3, wherein beam absorber 15 and the preferred sweep and scan currents applied to deflection coil 21 are respectively depicted. Because the electron beam is functionally operative for measuring purposes only in the vicinity of the senors during a traversal of the electron beam, the beam preferably is traversed slowly proximate the sensors with the traversal rate of the electron beam being increased along areas remote from the sensors. To effectuate this result, the sweep current 66 and scan current 67 applied to deflection coil 27 preferably exhibit a time rate change, e.g. a shallow slope or slow traversal rate in areas proximate the sensors with a steep slope or fast traversal rate being utilized in areas remote from the sensors.

Referring again to FIG. 1, the sweep and scan currents preferably are produced by a 60 cycle square wave current generator 56 and a 400 cycle square wave current generator 57, respectively, with outputs from the square wave generators being applied to voltage modifying circuits 62, e.g. a series connected resistor and capacitor having a long time constant to produce an exponential drop in the applied square waves, prior to application of the current waveforms to deflection coil 21. Voltage modifying circuits 62 can be omitted when the square wave current generators inherently produce a sloping, poor quality "square" wave.

The sweep pattern of the electron beam across beam absorber 15 can be observed in FIG. 2 in conjunction with current waveforms 66 and 67 which waveforms (depicted in FIG. 3) are produced by voltage modifying circuits 62 and applied to deflection coil 21 to sweep and scan the electron beam across the beam absorber. At time T1, maximum positive currents from the sweep and scan waveforms are applied to deflection coil 21 and the electron beam is positioned in the upper left hand corner of the beam absorber. As the applied currents fall exponentially, the beam traverses a sloping path 68 across the portion of beam absorber 15 proximate sensor 26 until time T2 when the beam is positioned along an extension of peripheral edge 69 of aperture 24 in beam absorber 15 whereupon the sharply sloping portion 70 of waveform 66 sweeps the beam to the lower left hand portion of the beam absorber proximate Faraday cage 31. The electron beam then traverses an exponential path 73 proximate Faraday cage 31 until time T3 when the beam has reached an extension of peripheral edge 71 of aperture 24 and the sharply sloping portion of the applied sweep current to the deflection coil rapidly sweeps the electron beam back to a position proximate sensor 25. The beam continues sweeping the beam absorber at a relatively slow rate proximate sensor 25 and Faraday cage 31 and at a fast rate intermediate the sensor and Faraday cage until time T4 when the electron beam is positioned along edge 76 of aperture 24 and the sharply sloping portion 77 of the applied current from scan waveform 67 moves the beam to the right hand portion of the beam absorber. The electron beam then is traversed across sensors 26 and 27 in a manner similar to that described with sensor 25 and Faraday cage 31, e.g. the electron beam scanning portions of beam absorber 15 proximate the sensors 26 and 27 for a relatively long time period with the distance between the sensors being traversed at a rapid rate. Scanning of the beam proximate sensors 26 and 27 continues until time T5 when the beam is situated along the edge 79 of aperture 24 and the sharply sloping portion 77 of waveform 67 returns the beam to the left hand side of the detector to repeat the beam traversal cycle.

Because sweep waveform 66 and scan waveform 67 are shaped relative to aperture 24 in beam absorber 15 to vary the traversal of the deflected electron beam between a slow rate scan along the beam absorber and an extremely rapid rate scan as the beam reaches a peripheral edge of the aperture, a rapid scan of the focused beam across workpiece 13 is assured. The scan rate (or dwell period) of the beam is set relative to the material forming workpiece 13 and the welding intensity of the electron beam to inhibit melting of the workpiece by the focused beam until the beam traversing currents applied to deflection coil 21 are terminated. Similarly, the application of non-synchronous current pulses to the deflection coil assures that the beam does not traverse the same path during successive traversals across the surface of workpiece 13. Thus a traversed beam of full welding intensity can be aligned without damage to the workpiece positioned at the focal point of the electron beam. Because the beam absorber is positioned at an elevation differing from the sphere defined by the scanning of the focal point of the electron beam, the energy density of the beam upon the absorber is minimized and the generated heat can be conducted away by the coolant flowing within conduits 28. The elevated position of beam absorber 15 also allows an unobstructed view of the workpiece during detection of the focal point of the electron beam.

Although the described electron beam traversal and steering are produced by electromagnetic deflection of the electron beam, other known beam deflection methods such as electrostatic deflection also can be employed to effect these results. Similarly, the traversal pattern of the electron beam can be other than the pattern produced by non-synchronous time rate change pulses provided at least two sensors are traversed by the beam during a traversal pattern.

When it is desired to spatially locate the electron beam focal point for a welding operation, Faraday cage 31 is positioned at a location empirically determined both for the workpiece thickness and for an electron beam of the desired welding power and standard reference voltage 45 is set at the voltage level produced by Faraday cage 31 during traversal of an axially focused and properly positioned beam of the welding power. Beam traversal current pulses of 60 c.p.s. and 400 c.p.s. are applied to deflection coil 21 from the square wave generators 56 and 57, respectively, and the beam is raised to a welding power level. The full power electron beam is swept and scanned across the sensors along beam absorber 15 at a non-uniform rate, e.g. a slow beam traversal along the beam absorber proximate the sensors and a rapid beam traversal across workpiece 13. The generated outputs from sensors 25 and 26 aligned in an X plane are summed over a 3 second time period in integrating circuits 40 and 36, respectively, and compared in comparator circuit 41 to produce an error signal of desired magnitude from current source 43. The integrated output signals from sensors 25 and 26 also are applied to discriminator circuit 35 to control the polarity of the signal from the current source (e.g. the correctional direction in which the electron beam is moved along the X axis). The signal from current source 43 then is applied to steering coil 42 to centrally position the beam intermediate sensors 25 and 26. Similarly, the generated outputs from sensors 26 and 27 aligned in an X plane are summed over a 3 second time period in integrating circuits 36 and 37, respectively, and compared both in comparator circuit 38 and discriminator circuit 48 to produce an error signal from current source 39 which signal is applied to steering coil 42 to centrally position the beam intermediate sensors 26 and 27, e.g. along the Y axis. Because the location of beam absorber 15 is known relative to the position of workpiece 13, the centering of the electron beam within the central aperture of the beam absorber results in a known beam location in the plane of the workpiece.

The axial position of the beam is controlled by the generated output signal from Faraday cage 31 which is summed over a 3 second interval and compared to the standard reference voltage, e.g. the voltage produced by Faraday cage 31 when situated at the focal point of an electron beam of the welding intensity, to produce an axial error signal from comparator circuit 51 proportional to the variation between the actual focal point and the desired focal point for welding workpiece 13. A comparison of the signals produced by axially displaced Faraday cages 31 and 32 produces a signal indicative of the axial correction direction and the signal is fed to servo amplifier 46 to control the direction of movement of manual focus control 47. The axial error signal from comparator circuit 51 also is applied to servo amplifier 46 to drive manual focus control 47 to a position properly focusing the electron beam in an axial direction. Welding then can be commenced by terminating the sweep and scan pulses applied to deflection coil 21. Prior to the termination of the sweep and scan pulses to the deflection coil however, suitable means such as relays (not shown) serve to disconnect manual focus control 47 and current sources 39 and 43 from their input sources and the output signals from manual focus control 47 and current sources 39 and 43 are locked at their respective magnitudes to properly position the electron beam upon workpiece 13 for the duration of the welding cycle.

The sweep and scan currents applied to deflection coil 21 to traverse the electron beam preferably are nonsynchronous, time rate change current pulses which can conventiently be formed by imparting a slight sloop to 400 c.p.s. and 60 c.p.s. current pulses. The time rate change pulses of both the sweep and the scan waveforms are configured to produce a rapid scan rate as the beam reaches the periphery of aperture 24 with the traversal rate being relatively slow as the beam traverses beam absorber 15 proximate the sensors. Because the scan and sweep current waveforms are non-synchronous, successive beam traversals across aperture 24 are initiated at differing locations along the inner edge of beam absorber 15 and successive traversal paths across the workpiece differ to prevent damage to the workpiece.

Detection of the electron beam focal point during welding is accomplished by utilization of the electron beam welding apparatus depicted in FIG. 4. Because the beam detection period is limited to a relatively short interval, e.g. 3–4 milliseconds for typical welding rates of one inch per second, the waveforms applied to deflection coil 21 from scan and sweep waveform generating circuits 62A and 62B, respectively, are of a frequency and configuration to produce at least a single traversal of two sensors during the 3–4 millisecond interval. Preferably the scan and sweep waveforms produce a beam traversal of all five beam sensors in one scan cycle of approximately 3.5 milliseconds.

Because beam detection is limited to a relatively short interval, a dual beam oscilloscope 80 having individual input terminals respectively connected to each of sensors 25, 26 and 27 is employed to allow a visual comparison of the transient signals from the sensors and manually adjustable current sources 39A and 43A connected to steering coil 42 are varied by an amount required to centrally position the beam between the sensors, e.g. produce an equal transient response from the aligned sensors.

A second oscilloscope 82 has individual inputs connected to Faraday cages 31 and 32 to visually display the transient responses of the Faraday cages for a determination of the axial location of the focal point. The observed transient response of Faraday cage 31 is compared to the desired transient response for a beam of the welding power utilized and manual focus control 47 is adjusted empirically to produce the desired response from Faraday cage 31.

Because the detection period is small and there is no requirement either that the beam intensity be diminished or the workpiece be removed during focal point detection, welding of the workpiece can be commenced immediately after the beam has been located.

While several examples of this invention have been shown and described, it will be apparent to those skilled in the art that many changes may be made without departing from this invention in its broader aspects; thus the electron beam positioning device of this invention is not necessarily limited to an electron beam welding apparatus and can be employed in any application, e.g. particle accelerators, wherein the positioning of a focused electron beam is required. Similarly positively charged particle apparatus such as are employed in ion deposition can employ the beam detection device of this invention to properly position the ion deposition. Therefore the appended claims are intended to cover all such changes and modifications as fall within the true spirit and scope of this invention.

What I claim as new and desire to secure by Letters Patent of the United States is:

1. An electron beam welder comprising a source of electrons, means for focusing said electrons into a beam of welding intensity impinging upon a workpiece to be welded, an electron beam absorbing surface disposed intermediate said workpiece and said electron beam source at a location relative to said electron beam to permit said beam to impinge upon said workpiece during welding, means for passing a fluid coolant across said surface, means for deflecting said welding intensity beam from said workpiece to said cooled surface, means for applying at least one electrical signal to said deflection means to produce a generally continuous traversal of said welding intensity electron beam across said cooled surface at a rate to inhibit electron beam dwell thereon for the period required to produce electron beam damage to said surface, means for traversing said workpiece below said electron beam, and means for removing said electrical signals from said deflection means for a period sufficient to effect welding of said traversed workpiece by said undeflected beam.

2. An electron beam welder according to claim 1 wherein at least one said electrical signal is characterized by a generally constantly varying amplitude with time and further including means disposed along the deflected path of said electron beam for determining the focal point of said beam and means responsive to said focal point determining means for positioning said beam along the plane of said workpiece.

3. An electron beam welder according to claim 1 wherein said cooled surface is a copper plate having a central aperture for the passage of an electron beam during welding, said plate being positioned at a location along said electron beam axis to intercept said beam in a non-focused condition.

4. An electron beam welder according to claim 1 wherein said deflection means are intermittently applied to said electron beam during welding, the deflection period of said beame being small relative to the traversal rate of said workpiece below said electron beam.

References Cited
UNITED STATES PATENTS

| | | | |
|---|---|---|---|
| 2,746,420 | 5/1956 | Steigerwald | 219—121 |
| 2,928,943 | 3/1960 | Bartz et al. | 219—121 |
| 2,956,169 | 10/1960 | King et al. | 250—49.5 |
| 3,207,982 | 9/1965 | Rose | 250—49.5 |
| 3,268,812 | 8/1966 | Meyer et al. | 250—49.5 |
| 3,293,429 | 12/1966 | Leboutet et al. | 250—49.5 |
| 3,308,264 | 3/1967 | Ullery | 219—121 |
| 3,326,176 | 6/1967 | Sibley | 219—121 |
| 3,371,274 | 2/1968 | Davey | 250—49.5 |
| 3,395,279 | 7/1968 | Moore | 250—49.5 |

JOSEPH V. TRUHE, Primary Examiner

W. DEXTER BROOKS, Assistant Examiner